July 23, 1968 J. PEARL 3,393,526
CRYOGENIC HEAT PUMP INCLUDING MAGNETIC MEANS
FOR MOVING A NORMAL ZONE ALONG
A SUPERCONDUCTIVE ROD
Filed June 29, 1966

INVENTOR.
JUDEA PEARL
BY
Simon Yaffee
Attorney

United States Patent Office 3,393,526
Patented July 23, 1968

3,393,526
CRYOGENIC HEAT PUMP INCLUDING MAGNETIC MEANS FOR MOVING A NORMAL ZONE ALONG A SUPERCONDUCTIVE ROD
Judea Pearl, Gardena, Calif., assignor to Radio Corporation of America, a corporation of Delaware
Filed June 29, 1966, Ser. No. 561,481
2 Claims. (Cl. 62—3)

ABSTRACT OF THE DISCLOSURE

Heat is pumped from one chamber, which is below the critical temperature of a superconductive material, into another chamber, which is also below the said critical temperature, by placing the ends of a rod or rods of that material in heat transfer relation to the two chambers respectively and by applying a magnetic field, which is strong enough to cause a zone of said rod or rods to become normal, to the end of the rod or rods that is in heat transfer relation with the first chamber. When the zone on the rods becomes normal, it withdraws heat from the first chamber, cooling it. Then the magnetic field, and therefore the normal zone, is moved along the rod to the second chamber, whereby the second chamber absorbs the heat that is trapped in the normal zone and that moves with it. The process may be repeated to still further cool the first chamber.

Figure 1:
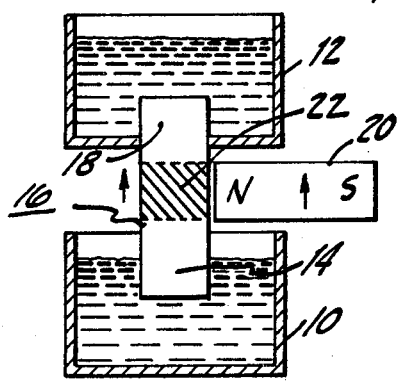

This invention relates to heat pumps which are useful to reduce the temperature of a substance down to a temperature approaching absolute zero.

In cryogenic research, it is often desirable to cause the temperature of a substance in a reservoir to approach absolute zero. This is done by pumping the heat from the substance or from the reservoir containing the substance into a substance or reservoir at a higher temperature, that is, causing the heat to flow against the temperature gradients existing between the two reservoirs.

Certain substances become superconductive when they are reduced in temperature below the critical temperature ($T_c$) for the substance. That is, below the critical temperature of certain substances having critical temperatures, the electrical resistance thereof disappears, and if current is started to circulate in a superconductive circuit it flows indefinitely and the accompanying magnetic field also persists indefinitely. Furthermore, since the resistance of the substance is zero, no heat is produced by the flow of electricity in the substances. It is known that when a superconductive material is changed from its superconductive to its normal state, that is, made normal, it withdraws heat from its surroundings, whereby the surroundings are cooled off. Cryogenic heat pumps are known in which this phenomenon is used.

It is an object of this invention to provide an improved cryogenic heat pump.

It is a further object of this invention to provide an improved heat pump based on the phenomenon of heat absorption by a superconductive material when it becomes normal.

According to this invention, a rod of superconductive material is kept at a temperature below its critical temperature throughout its length. One end of the rod extends into heat exchange relation with a reservoir, which is already below the critical temperature of the material of which the rod is made and which is to be cooled still further. The other end of the rod extends into heat exchange relation with another or reference reservoir whose temperature is kept constant and below the critical temperature of the material of the rod. A magnetic field is applied to the one end of the rod, the magnetic field being of sufficiently great intensity as to cause a zone of the rod including the one end of the rod to become normal whereby the normal zone of the rod absorbs heat from the first reservoir. The magnetic field is moved along the rod towards the other end thereof whereby the portion of the rod that is in the magnetic field changes and whereby the zone of the rod that is driven normal also changes and moves along the rod to the other end thereof. Heat is trapped in the normal portion of the rod and also moves along the rod until it reaches the reference reservoir where the heat is absorbed. The first reservoir is cooled by this operation. When the magnetic field is no longer applied to the rod, the rod reverts to its superconductive state since it is kept at a temperature below its critical temperature along its whole length. The process may be repeated to further cool the first reservoir. To reduce eddy current losses, many thin rods or wires of superconductive material, which are insulated from each other, may be used instead of a single, heavier rod. The moving magnetic field may be produced by a moving magnet or it may be produced electromagnetically.

Figure 4:
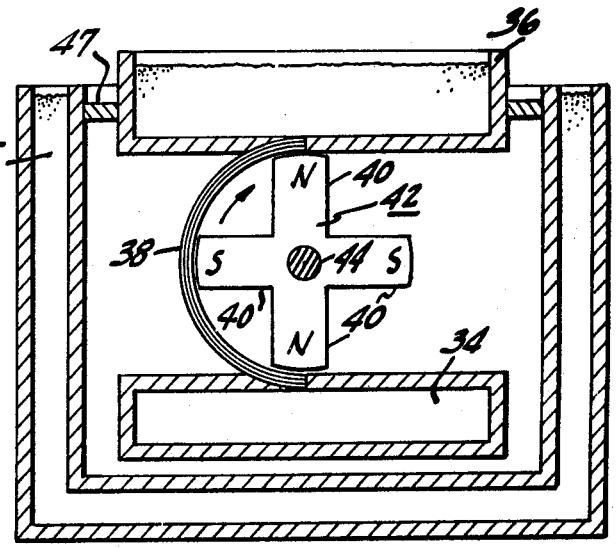
Figure 2:
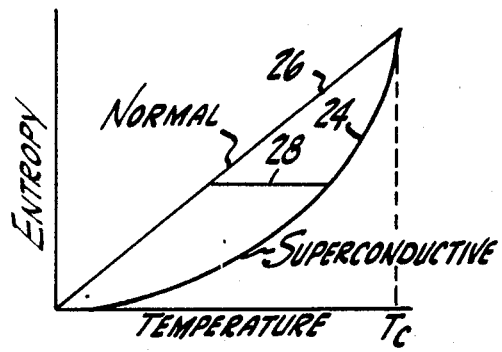
Figure 3:
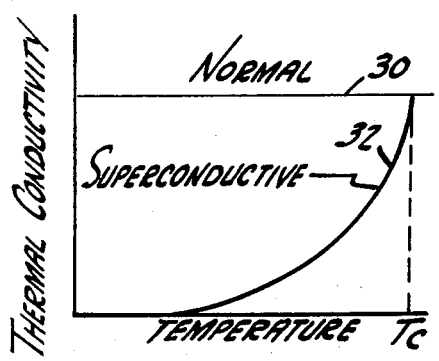
Figure 5:
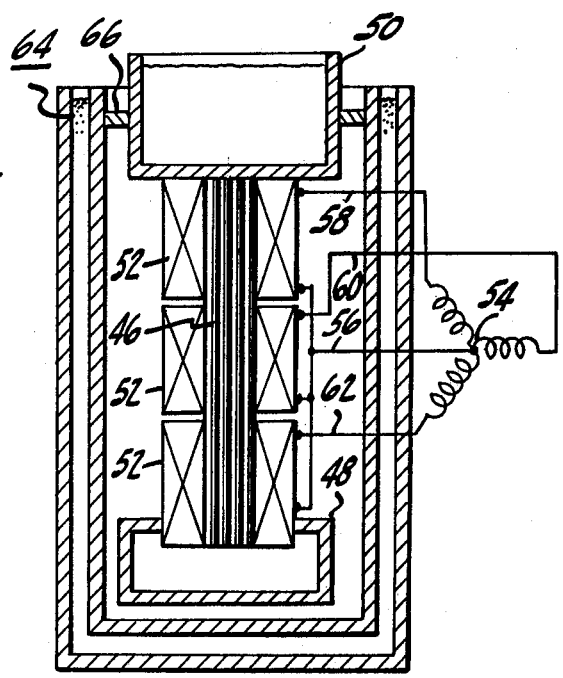

The invention may be better understood upon reading the following specification in connection with the accompanying drawing in which:

FIGURE 1 is a diagrammatic illustration of a heat pump according to this invention, FIGURES 2 and 3 are curves useful in explaining the operation of the device of FIGURE 1, and FIGURES 4 and 5 are diagrammatic illustrations of embodiments of this invention.

Referring to FIGURE 1, a reservoir 10 of liquid helium is provided, the temperature of which is to be reduced. A second or reference reservoir 12 of liquid helium is also provided. The reservoir 12 is sufficiently large so that the temperature of the helium contained therein does not increase even though, as will be explained, heat is pumped thereinto. One end 14 of a rod 16 of superconductive material extends into the chamber 10 and the other end 18 of the rod 16 extends into the chamber 12. A magnet 20 is moved along the rod 16 from the end 14 thereof towards the end 18 thereof, the field of the magnet 20 causing a portion or zone 22 of the rod 16 to become normal even though the rod remains below its critical temperature throughout its length. Therefore, except for the portion or zone thereof penetrated by the magnetic field, the rod 16 is superconductive throughout its length, only the zone of the rod that is adjacent to a pole of the magnet being normal. The polarity of the magnetic field is unimportant for the operation of this device. When the magnet 20 is moved along the rod, the normal zone 22 changes position and moves with the magnet 20 from the end 14 of the rod 16 to the end 18 of the rod 16. Each time the magnet 20 is so moved, some of the heat of the helium in the reservoir 10 is pumped out of the reservoir 10 and into the reference reservoir 12, whereby the temperature of the reservoir 10 is reduced. The reason for this operation of the device of FIGURE 1 is explained in connection with FIGURES 2 and 3.

FIGURE 2 is a graph of the entropy plotted against the temperature of a superconductive material. When the material is below the critical temperature thereof (indicated in FIGURE 2 by the dotted line $T_c$) then the superconductive material becomes superconductive at relative values of entropy and temperature indicated by the curved line 24. If the material remains normal, its curve of entropy plotted against temperature is the straight line 26. When the superconductive material in its superconductive state is made normal adiabatically, as by applying a magnetic field thereto, the material goes normal along some lines such as 28, that is the material in going normal adiabatically becomes cooler. This is shown by the fact that the line 28 is going from the line 24 indicating superconductivity to the line 26 indicating normality, without addition or subtraction of heat, is parallel to the temperature axis and is in the direction of decreasing temperature. The normal portion of the superconductor therefore picks up heat from its environment and in equalizing its temperature with that of its environment, the environment is cooled. Heat moves along the superconductive rod 16 with the normal portion 22 thereof for reasons explained in connection with the curve of FIGURE 3.

As shown by FIGURE 3, the thermal conductivity (as distinct from the electrical conductivity) of a normal material, indicated by the line 30 is substantially constant with changes of temperature. Also, as indicated in FIGURE 3 by the line 32, the thermal conductivity of a superconductive material in its superconductive state is much less than the thermal conductivity of the same material in its normal state. As the magnet 20 moves along the rod 16, the portion of the rod 16 behind the zone 22 which is driven normal by the magnetic field of the magnet 20, reverts to its superconductive state, whereby the thermal conductivity of this superconductive portion of the rod is greatly reduced. The portion of the rod 16 which is rendered superconductive when the field of the magnet 20 has passed on gives up heat, while the adjacent zone or normal portion made normal by the field of the magnet absorbs heat, whereby the heat withdrawn from the reservoir remains in the zone 22. Furthermore, since the thermal conductivity of the superconductive portion of the rod is very low, the heat cannot escape out of the zone 22 as it changes position along the rod 16. Therefore, the heat absorbed by the zone 22 from the reservoir 10 is trapped in the zone 22 and is moved along the rod 16 as the zone 22 moves along the rod 16. This heat is brought into the reservoir 12 where this heat is absorbed by the helium bath contained in the reservoir 12. In this manner heat is withdrawn from the reservoir 10 and is pumped into the reservoir 12 each time the magnet 20 is moved along the rod from the bottom end 14 thereof, as viewed in FIGURE 1, beyond the top end 18 thereof.

An apparatus for continually pumping heat from a first reservoir 34 to another reservoir 36 is shown in FIGURE 4. In this figure, a bundle of rods 38 of super conductive material is provided, these rods being insulated from each other. While only three rods 38 are shown there may be as many rods as is convenient. The rods are made small in cross section to minimize the induction of eddy currents, and therefore of heat, in the rods 38 as a magnet 40 moves along the rods 38. As shown, the magnet 40 may be one of a group 42 thereof extending radially as the spokes of a wheel from a center axle 44 about which they are mounted for rotation. While the group 42 is shown as including only four magnets, there may be as many magnets 40 included in the group 42 as is desired, it being remembered that the poles of the magnets must be sufficiently spaced so that the normal zones (not shown) of the rods 38 produced by the magnets remain separate as the magnets 40 rotate clockwise as viewed in FIGURE 4. The rods 38 extend in a circular manner and for less than a complete circumference of a circle, the center of the curvature of the rods 38 and the center of rotation of the group of magnets 40 being at the same point. One end of the rods 38 extends into the reservoir 34 to be cooled and the other end of the rods extends into the reference reservoir 36. Since liquid helium would usually be used in the reservoirs 34 and 36, the rods 38 may be sealed to the adjacent portions of the reservoirs 34 and 36 to prevent leakage of helium and to still provide efficient heat exchange between the ends of the rods 38 and the reservoirs 34 and 36. A double walled flask 45 full of helium may surround the reservoirs 34 and 36, the rods 38 and the magnets 40 to keep the rods 38 below their critical temperature. To further prevent leakage of heat into the flask 46, an airtight seal 47 may be provided between the flask 45 and the reservoir 36 and the space inside the flask 45 may be evacuated.

The operation of the heat pump of FIGURE 4 is identical with that of FIGURE 1. Due to the magnetic field applied thereto by the group of magnets 40, zones of the superconductive rods 38 become normal. When a zone of the rod 38 is heat transfer relation to the reservoir 34 becomes normal, it absorbs heat from the reservoir 34. This heat travels along the rod 38 as the ends of the magnets 40 travel along the rods 38 and the heat is absorbed by the liquid helium in the reservoir 36. With each travel of a zone from the reservoir 34 to the reservoir 36, heat is pumped from the reservoir 34 and the reservoir 34 is cooled.

A static heat pump is shown in FIGURE 5. In this figure a bundle of straight rods 46, only four rods being shown, extends from the reservoir 48 to be cooled into heat transfer relation with a reference reservoir 50. A plurality of magnetic coils 52 are provided. These coils 52 surround the rods 46 and are positioned in succession along the rods 46 from the bottom end thereof, as viewed in FIGURE 5, which extend into the reservoir 48 up to the reservoir 50. The coils are energized from a three-phase source indicated by the Y-connected three-phase transformer secondary 54 in such a manner that a magnetic field travels up the rod 46 from the lower ends thereof towards the upper ends thereof. Such connections are well-known and are indicated by the connections of the common conductor 56 in parallel to one end of each of the coils 52 and to the common point on the transformer secondary 54 and by the individual connections 58, 60 and 62 connecting the respective windings 52 to the respective terminals of the transformer secondary 54. All the conductors 56, 58, 60 and 62, as well as the conductors comprising the coils 52 may be of superconductive material, whereby no heat is evolved within the described heat pump by the means for producing a traveling magnetic field. To keep the rods 46 and the coils 52 at temperatures at which they remain superconductive, a double walled flask 64 is provided surrounding the coils 52 and the rods 46, the flask 64 being filled with liquid helium. To prevent leakage of helium, the lower ends of the rods and coils may be sealed into the top of the reservoir 48 and the upper ends of the rods and coils may contact the bottom of the reservoir 50 but not enter thereinto. Also if desired, a vacuum tight seal 66 may be provided between the flask 64 and the reservoir 50 and the space inside the flask 64 may be evacuated. Upon energization of the transformer secondary 54 by a polyphase (here shown as a three-phase) current supply, a magnetic field will travel along the rods 46. This magnetic field may be made to travel away from the reservoir 48 by proper choice of connections from the individual coils 52 to the terminals of the transformer 54 in a known manner. Traveling zones of normal material separated by superconductive material may be formed in the rods 46, and the normal zones will carry heat with them away from the reservoir 48 into the reservoir 50 whereby the reservoir 48 will be cooled.

Modifications of the embodiments shown and described will be evident to a person skilled in the art. For example, in FIGURE 4, the magnets 40 may be electromagnets instead of permanent magnets as shown, and in FIGURE 5, the two reservoirs 48 and 50 may be arranged side by side and the rods 46 and the coils 52 surrounding them may be curved, with the respective ends of the rods 46 extending into the tops of the reservoirs 48 and 50. The above description is therefore to be considered as illustrative and not in a limiting sense.

What is claimed is:

1. A heat pump for pumping heat from one reservoir to another comprising:

a rod of superconductive material having ends extending into heat transfer relation with respective ones of said reservoirs, said rod being curved to extend along the circumference of a circle, magnetic means for causing a zone of said rod to become normal and for moving said zone along said rod from said one of said reservoirs towards said other of said reservoirs, said magnetic means comprises a plurality of magnets extending radially from the center of curvature of said circle towards said rod, and including means for rotating said magnets about said center of curvature to move said normal zones from said one towards said other reservoir.

2. A heat pump for pumping heat from one reservoir to another comprising:

a rod of superconductive material having ends extending into heat transfer relationship with respective ones of said reservoirs, magnetic means for causing a zone of said rod to become normal and for moving said zone along said rod from said one of said reservoirs towards said other of said reservoirs, said magnetic means including a plurality of windings surrounding said rod and positioned along said rod, and also including polyphase alternating current means for energizing said windings in a manner to cause a magnetic field to travel along said rods from one reservoir toward said other reservoir.

References Cited
UNITED STATES PATENTS 3,108,444    10/1963    Kahn _____ 62—3
3,121,265    2/1964    Hoh _____ 62—3 X ROBERT A. O'LEARY, *Primary Examiner.*

A. W. DAVIS, *Assistant Examiner.*